Patented Nov. 5, 1935

2,019,494

UNITED STATES PATENT OFFICE 2,019,494

FLAVORING MATERIAL AND METHOD OF USING SAME

Stroud Jordan, Brooklyn, N. Y., assignor, by mesne assignments, to American Lecithin Company, Cleveland, Ohio, a corporation of Ohio No Drawing. Application August 29, 1932,
Serial No. 630,976

15 Claims. (Cl. 99—11)

My invention relates to flavoring materials and to a method of using the same, in the production of food products.

It is well known that there are four types of flavors in general use. These types comprise extracts, emulsions, essential flavors, and solutions of essential flavors in an oily medium.

Extracts are made by dissolving out the essential flavor ingredients from any natural material, in water, alcohol or other solvent, miscible with water or alcohol, or by the compounding of imitation, synthetic or natural flavoring materials, in such solvent. Such flavoring extracts are not entirely or readily oil or fat soluble, and, in fact, many of them are almost entirely insoluble in an oil or fat medium.

The second type of flavor, the flavoring emulsions, consist of emulsions of essential oils, synthetic flavor bases, or imitation flavors of any nature, which are only slightly soluble in water, but which have been dispersed through an aqueous medium and stabilized, at least temporarily by the addition of protective colloids of any desired character.

The third type, known as essential flavors, are composed of essential oils, natural solid flavors, such as vanillin, cumarin, menthol, thymol and the like, synthetic flavoring materials, such as methyl salicylate, benzaldehyde and the like and imitation flavor bases, such as esters, ethers, alcohols, acids and the like, which may be used in the compounding of an imitation flavor. The majority of these materials are of such a nature that they do not always require a solvent, except when it is desirable to dilute them to the proper strength for convenient usage.

The fourth type, known as oil-soluble flavors, are composed of essential materials, either natural, synthetic or imitation, dissolved or dispersed through an oily medium. This type of flavor is only slightly soluble in an aqueous medium and sparingly soluble in other solvents, which contain notable quantities of water.

The present invention has particular reference to the use of the third and fourth types of flavor, which, for convenience, will hereinafter be referred to as oil-soluble flavors or oil-soluble flavoring materials. I have discovered that when oil-soluble flavors are employed in the preparation of a food product that their full strength is not apparent, unless there is also present an emulsifying material, such as lecithin or phosphatide combined with the oil soluble flavors, before the same is introduced into the constituents of the product. If lecithin or phosphatide is present, when such flavors are added to a food product, a more intense flavor is produced.

As illustrating the advantages of the invention, I will compare different results obtained, by using an oil soluble raspberry flavor, also an alcoholic extract of raspberry, both flavors being of a comparable strength. Equal quantities of these two flavors were used in equal sized batches of salt water taffy. In the case of the oil soluble flavor, it was found that when lecithin or phosphatide was first added to the same in a suitable amount before its introduction into the batch, that the oil soluble flavor appeared to be much stronger than the extract flavor. The oil soluble flavor had a taste which was more penetrating, and it is possible to obtain a comparable flavor, with twenty-five percent (25%) less of the oil soluble flavor, than is required when the alcohol extract is employed. The oil soluble flavor thus produced decided economy, and a more lasting taste.

The oil soluble flavoring material, having lecithin directly incorporated therein, may be used with improved results, in the making of hard candies. The oil soluble flavoring material without added lecithin may be volatile in steam, and therefore, may volatilize when introduced into a hot batch of hard candy, since the batch of hard candy is subjected to a heat treatment of about 300° F. to 320° F. at atmospheric pressure.

In the usual practice of introducing the oil soluble flavoring material without added lecithin into the hot batch of hard candy, a considerable portion of the oil soluble flavoring material may be lost by volatilization of the same, which is indicated by the odor which permeates the room when such addition is made.

In the usual production of hard candies, after the batch has been subjected to the heat treatment of about 300° F. to 320° F., for a suitable length of time, to drive off the major portion of the water content, the batch is poured onto a slab, to allow escape of the excess heat, and at this point, while the batch is still at a high temperature, around 300° F., an oil soluble flavoring material, such as lemon oil without added lecithin, may be added and worked in mechanically, along with color and desired organic acids. Due to the heat present, the vaporization of the lemon oil under such conditions, is rapid, which loss of lemon oil renders it necessary to use more than would be required, if such volatilization could be prevented, or materially lessened.

I have discovered that the volatilization of oil soluble flavors, at this point, may be prevented or materially lessened, by directly incorporating lecithin or other phosphatide with the oil soluble flavors, by dissolving the lecithin or phosphatide therein, before the addition of the oil soluble flavors to a hot batch.

As a specific illustration, I will take the production of hard candy, containing little or no added fat. In the production of the hard candy, I employ the usual mixtures of corn syrup, sucrose, invert sugar, and other suitable sugars, such as lactose, dextrose, and maltose, and dissolve the same in a suitable amount of water. This mass is then subjected to the ordinary heat treatment of about 300° F. and 320° F., and after the desired amount or major portion of the water content has been removed, by the heat treatment, upon the completion of the cooking, the entire batch is removed from the cooker and placed on a suitable table. The oil soluble flavoring material, such as lemon oil, is added at this point when the batch is still hot, having a temperature of about 300° F. Prior to adding the lemon oil to this batch, I dissolve lecithin or phosphatide in the lemon oil. I employ from one-tenth percent (.1%) to twenty-five percent (25%) of lecithin by weight, with respect to the weight of the lemon oil. Satisfactory results are obtainable by employing ten percent (10%) by weight of the lecithin or phosphatide with respect to the weight of the lemon oil. The lemon oil with the lecithin dissolved therein, is now added to the hot batch, in from one-tenth percent (.1%) to five-tenths percent (.5%) or more, by weight, with respect to the total weight of the sugars. The mass is mechanically worked so that the lemon oil is properly distributed throughout the same.

I have found that when an oil soluble flavor, having the lecithin dissolved therein, is added to the hot batch, as indicated, that volatilization of the oil soluble flavor is prevented or retarded to a considerable extent, thus effecting an economy in the use of such oil soluble flavoring material. Further, the presence of the lecithin will cause the oil soluble flavoring material to emulsify with the remaining small water content of the batch, thus uniformly distributing the oil soluble flavoring material throughout the batch and producing a more intense flavor. An oil soluble flavoring material may be normally highly volatile in the absence of lecithin, but the added lecithin materially reduces the volatilization of the oil soluble flavoring material in proportion to the amount of lecithin added, until the oil soluble flavoring material is substantially fixed. Therefore, the lecithin dissolved in the oil soluble flavoring material has two functions, to wit, the fixing of the oil soluble flavoring material, and second, the more thorough distribution of the oil soluble flavoring material through the mass.

The example cited, where hard candy is made, and lemon oil with lecithin dissolved therein added, may be parallel in any confection which contains little or no fat and little or no water. The same results will also be obtained where notable quantities of water or fat are present. If the heat of the batch is sufficiently hot to vaporize added flavoring materials, the lecithin or other phosphatides, act both as a fixitive and as an emulsifier, holding in the flavor and causing it to be dispersed uniformly.

The use of lecithin or phosphatide in the flavoring of salt water taffy and hard candies has served to illustrate its value insofar as these products are concerned. A further example, where oil soluble flavors are employed in baking, may be illustrated by the production of cake, in which an oil soluble flavoring material is used, and compared with a cake, in which the same flavoring has been employed with lecithin. As a definite example of my invention, I will use the following cake formula.

| | Parts by Weight |
|---|---|
| Sugar | 90.0 |
| Salt | 2.0 |
| Shortening | 45.0 |
| Whole eggs | 50.0 |
| Water | 50.0 |
| Dry skim milk | 6.5 |
| Baking powder | 2.0 |
| Flour | 100.0 |

The above ingredients produce the cake batch, except for the addition of a desired flavor.

In producing a cake from the above formula, the eggs, an equal amount of sugar, which would be fifty parts by weight, and the entire amount of salt are blended and whipped to desired consistency. The remainder of the sugar, which is forty parts by weight, the entire amount of shortening and any desired oil-soluble flavor, such as imitation butter flavor, oil soluble vanilla flavor, which may be natural or synthetic, or oil-soluble spice flavor, which is made by dissolving the essential oils of desirable spices in an oily medium, are combined and creamed separately from the first batch. The mass, produced from the whipped eggs, sugar and salt, is then incorporated with the creamed shortening, sugar and flavor. In the meantime, the dry, skim milk is dissolved in the total amount of water, which is fifty (50) parts by weight and the baking powder is mixed or blended with the flour. The milk solution is then added to the mass, previously produced, along with the flour and the entire mass is suitably stirred or mixed. This produces the standard cake batch used for baking. The special cake batch is identical in every respect, except for the fact that lecithin is dissolved in the oil-soluble flavor, varying in amounts from one-tenth percent to twenty five percent, generally about ten percent.

When the standard cake is compared with the special cake, after baking, it will be noted that the special cake, in which lecithin has been incorporated, as described, before its introduction into the cake batch and before baking, that a stronger, more pleasing and more well rounded flavor is obtained. This is due to the emulsifying action of the lecithin, which has been dissolved in the oil soluble flavor, and further to its fixative properties, which materially reduce or entirely prevent loss of flavor by volatilization from the cake during the time it is subjected to the temperature necessary to baking.

While I have shown by example the application of my invention in the production of confections such as salt water taffy and hard candy, and in bakery products such as cake, I do not limit myself to these applications. In fact, the use of flavoring in confections, bakery products or food products of any nature where, by virtue of high heat, flavoring is lost by volatilization or in products where little or no heat has been employed, and the strength of the flavor reduced because it is not properly dispersed, I claim that a better product can be made when an oil soluble flavor in which lecithin has been incorporated is used than if a flavor of the same strength without lecithin is employed.

The word "lecithin" is used in its broadest sense, and intended to apply not only to pure lecithin, but also to commercial lecithin, a mixture of commercial lecithin and/or any or all of its components with other phosphatides and/or with fats occurring naturally in the animal and vegetable kingdom, separated or capable of being separated on a commercial scale in the pure or mixed state, which may, for any purpose, contain lecithin in effective amounts.

It is to be understood that the forms of my invention herewith shown and described, are to be taken as the preferred example of the same, and that various changes in the proportion of the ingredients, may be made, and changes in the order of the steps resorted to, without departing from the spirit of my invention, or the scope of the subjoined claims.

Having fully described my invention, what I claim is:

1. The herein described method of producing a bakery product having a desired flavor, comprising producing a bakery batch, directly adding lecithin to and incorporating the same within a normally volatile edible product flavoring material which is soluble in oil, then adding the edible product flavoring material thus treated to the bakery batch and incorporating the same therein, and then subjecting the batch to the action of a sufficiently high heat to bake the same, the presence of the added lecithin within the flavoring material preventing the volatilization of the flavoring material in whole or in part during the heat treatment.

2. The herein described method of producing a hard type confection, comprising producing a confection batch containing sugar and added water, directly adding lecithin to and incorporating the same within a normally volatile edible product flavoring material which is soluble in oil, and then adding the edible product flavoring material thus treated to the confection batch and incorporating the same therein, in the presence of heat sufficient to volatilize the edible product flavoring material without the added lecithin, the presence of the lecithin within the flavoring material preventing the volatilization of the flavoring material in whole or in part.

3. The herein described method of producing a hard type confection, comprising producing a heated hard type confection batch consisting of sugar and added water and free from any considerable amount of added fat, the batch having a temperature which will volatilize normally volatile flavoring material, directly adding lecithin to and incorporating the same within a normally volatile essential oil having flavoring properties, and then introducing the essential oil thus threated into and incorporating the same within the heated batch at the said volatilizing temperature, the presence of the added lecithin within the essential oil preventing the volatilization of the essential oil in whole or in part.

4. The method of producing a hard type confection, comprising producing a heated hard type confection batch consisting of sugar and added water and free from fat, the batch having a temperature which will volatilize normally volatile flavoring material, directly adding lecithin to and incorporating the same within a normally volatile essential oil having edible product flavoring properties and being free from added fat, and then introducing the essential oil thus treated into and incorporating the same within the heated batch at the said volatilizing temperature, the presence of the added lecithin within the essential oil preventing the volatilization of the essential oil in whole or in part.

5. A relatively non-volatile edible product flavoring material, comprising a normally volatile edible product flavoring material which is soluble in oil, and lecithin directly added to and incorporated within such flavoring material.

6. A relatively non-volatile edible product flavoring material, comprising a normally volatile edible product flavoring material which is soluble in oil, and one-tenth per cent to twenty-five per cent of lecithin directly added to and incorporated within such flavoring material.

7. A relatively non-volatile edible product flavoring material, comprising a normally volatile essential oil having edible product flavoring properties, and lecithin directly added to and incorporated within such essential oil.

8. The herein described method of producing a flavored candy batch having the maximum intensity of flavor for the given amount of flavoring material used, comprising forming the candy batch and heating the same to a temperature which would cause a normally volatile flavoring material to volatilize, treating a normally volatile edible product flavoring material which is soluble in oil to render the same non-volatile to a considerable extent by directly adding thereto and incorporating therein lecithin, and then combining the flavoring material thus treated with the candy batch while the same is at the volatilizing temperature, the presence of the added lecithin within the flavoring material rendering the same non-volatile in whole or in part.

9. The method of treating a normally volatile edible product flavoring material which is soluble in oil to render the same non-volatile in whole or in part at the temperature to which it is subjected when introduced into a heated confection batch, comprising directly adding to and incorporating within such flavoring material a phosphatide.

10. The method of treating a normally volatile edible product flavoring oil to render the same non-volatile in whole or in part at the temperature to which it is subjected when introduced into an edible batch, comprising directly adding phosphatide to and incorporating the same within the flavoring oil.

11. The method of treating a normally volatile fruit essential oil having an edible product flavoring property to render the same non-volatile to a considerable extent at the temperature to which it is subjected when introduced into an edible batch, comprising directly adding lecithin to and incorporating the same within the fruit essential oil.

12. The method of treating a normally volatile oil having edible product flavoring properties to render the same non-volatile to a considerable extent at the temperature to which it is subjected when introduced into an edible batch, comprising directly adding lecithin to and incorporating the same within such flavoring oil.

13. The method of treating a normally volatile essential oil having edible product flavoring properties to render the same non-volatile to a considerable extent at the temperature to which it is subjected when introduced into an edible batch, comprising directly adding from one-tenth per cent to twenty-five per cent by weight of lecithin with respect to the weight of the essential oil to such essential oil and incorporating the lecithin therein.

14. The method of producing a flavored edible product, comprising producing an edible batch, directly adding from one-tenth per cent to twenty-five per cent by weight of lecithin with respect to the weight of the essential oil to an essential oil having edible product flavoring properties and incorporating the same therein, and then combining such essential oil thus treated with the edible batch, the essential oil thus treated being non-volatile to a considerable extent at the temperature to which it is subjected while within the edible batch.

15. The method of producing a flavored edible product, comprising producing an edible batch, directly adding lecithin to a normally volatile essential oil having edible product flavoring properties and incorporating the same therein, and then combining such essential oil thus treated with the edible batch and subjecting the essential oil to the action of heat sufficient to volatilize the same without the added lecithin.

STROUD JORDAN.